Jan. 3, 1967  YASUHIRO SAWADA ET AL  3,295,374
METHOD AND DEVICE FOR MEASURING
PRESSURE OF FLUID IN VESSEL
Filed March 23, 1964  2 Sheets-Sheet 1

INVENTORS
YASUHIRO SAWADA
ZENSAKU AYUHA

Jan. 3, 1967  YASUHIRO SAWADA ETAL  3,295,374
METHOD AND DEVICE FOR MEASURING
PRESSURE OF FLUID IN VESSEL
Filed March 23, 1964  2 Sheets-Sheet 2

INVENTORS
YASUHIRO SAWADA
ZENSAKU AYUHA

BY Wenderoth, Lind & Ponack
attorneys

United States Patent Office 3,295,374
Patented Jan. 3, 1967

3,295,374
METHOD AND DEVICE FOR MEASURING PRESSURE OF FLUID IN VESSEL
Yasuhiro Sawada and Zensaku Ayuha, Kawasaki, Japan, assignors to Yawata Iron & Steel Co., Ltd., Tokyo, Japan, a corporation of Japan
Filed Mar. 23, 1964, Ser. No. 354,029
Claims priority, application Japan, Mar. 25, 1963, 38/13,597; Sept. 23, 1963, 38/51,071; Jan. 29, 1964, 39/4,185
3 Claims. (Cl. 73—395)

The present invention relates to a method and device for measuring a pressure of fluid, gas or liquid, in a vessel in general, and more particularly, to a method and device for measuring a pressure of fluid in a reaction process vessel which generates gas the pressure of which it is difficult to measure.

Heretofore, a continuous measurement of pressure of gas produced in such a reaction process vessel as a blast furnace or converter was considered to be almost impossible, because the generated gas contains a lot of dust and is at a high temperature. In the case of a blast furnace, for instance, according to the conventional pressure measurement system, the furnace body is provided with a pipe for extracting the generated gas and a cyclone device is installed in said pipe in order to eliminate dust from the extracted gas. The purified gas is then led to a gas pressure detecting converter, in which a pressure displacement is directly read or is converted to an electric signal to be further transmitted to an indicating and recording meter, which indicates and records the pressure of gas within the furnace according to said electric signal. However, the employment of such a conventional system for a long time was not permitted, because the pipe was easily clogged with dust due to imperfect dust collection by the cyclone device (the dust collector is not limited to a cyclone) or troubles often occurred in the pressure detecting converter. Even by strengthening the dust collecting capacity of the cyclone, said defects could not be avoided.

Further it was impossible to perform a continuous measurement of gas pressure, if dust contained in the gas was in a molten state, as a result of a complete clogging of an exit port of the gas-extracting pipe caused by dust which cooled down and coagulated at said exit port when extracted. In such a case, even an intermittent measurement of gas pressure was only insufficiently carried out.

An object of the present invention is to eliminate the above mentioned defects in the conventional pressure measurement system. The present invention provides a method and device for detecting and measuring a pressure of fluid in a vessel to be measured with a high degree of accuracy, while preventing the pipes from being clogged with dust. The principle idea of measuring the fluid pressure according to the present invention resides in that a feed-gas is supplied into a pressure measuring device connected by a pipe with the vessel containing fluid to be measured so that the pressure of the feed-gas may be placed in equilibruim with the fluid pressure in the furnace to be measured, and the pressure of feed-gas is measured and indicated as equivalent to the fluid pressure in the vessel to be measured. However, in practice, as the connecting pipe is to be prevented from being clogged with dust contained in the fluid the pressure of the feed-gas should be kept somewhat higher, though within a permitted range, than that of the fluid to be measured so that a flow of feed-gas in a small or considerable amount according to the conditions may be effected within the pipe in the direction toward the vessel. Further, in case the fluid dust contained in the fluid is in a molten state a feed-gas of high temperature is to be fed into the pressure detecting device in order to prevent the pipe from being clogged with dust which easily coagulates thereon. Thus, according to the present invention the fluid pressure in the vessel is measured indirectly by use of a feed-gas, but with a high degree of accuracy. The significance of measuring the fluid pressure in a vessel by the method and device according to the present invention is as follows, when adapted to a blast furnace. In operating a blast furnace, when a pressure in the lower part of the furnace (high temperature part) is measured, and then the difference is pressures between the lower and upper parts of the furnace is detected, it will be possible to fiind a permeability of gas passing through the furnace and the falling condition of the charge in the furnace, whereby the falling condition of the charge and blowing conditions may be controlled to the desired extent. Further, when control by means of an electronic computer is carried out in controlling the operating conditions of the furnace, the method and device according to the present invention will render a significant service as detecting means.

Thus, by adopting the method and device of the present invention it becomes possible to quickly detect any fluctuation in pressure within the blast furnace by detecting the feed-gas pressure corresponding to the changed pressure of the fluid in the blast furnace body to be measured by means of an automatic control system for regulating the feed-gas flow, even if a sudden fluctuation occurs in the fluid pressure in the furnace body.

The object of the present invention is to provide a method and device for performing with ease and a high degree of accuracy a continuous measurement of a fluid pressure in a vessel in which the fluid pressure is difficult to measure.

Another object of the present invention is to provide a method and device for performing with ease and a high degree of accuracy a continuous measurement of a fluid pressure in a vessel which fluid contains dust in a molten state.

Still another object of the present invention is to provide a method and device for performing with ease and a high degree of accuracy a continuous measurement of fluid difficult to measure by converting the pressure of said fluid to the pressure of a purified fluid.

Other objects of the present invention will be apparent from the following description and the attached drawings.

An embodiment of the present invention will be explained in the following, in which embodiment it is assumed that a vessel containing fluid to be measured is a reaction process furnace body such as blast furnace and dust particules contained in said fluid are not in a molten state.

Figure 1:
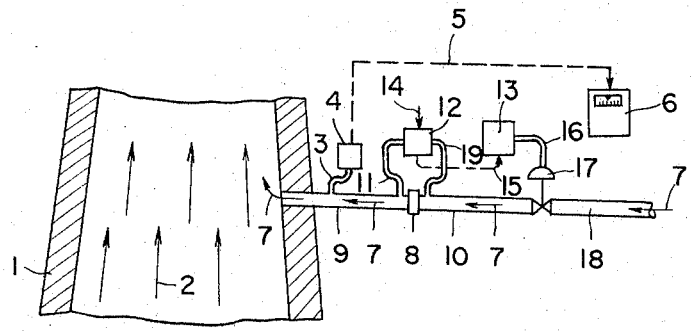
FIG. 1 is a block diagram of an embodiment of a pressure measuring control device according to the present invention.

In FIG. 1, the fluid the pressure of which is to be measured is a reaction gas 2 flowing up in a furnace body 1. A connecting pipe 9 is provided between the furnace body 1 and a throttle mechanism 8, which is made, for instance, of an orifice, and a pressure detecting pipe 3 is connected to said connecting pipe 9. 4 is a converter for converting a detected pressure to an electric signal, 5 is a chain line indicating a transmission of said electric signal to an indicating and recording meter 6. 10 is a pipe connecting the throttle mechanism 8 and a feed-gas flow regulating valve 17, and 18 is a pipe connecting said feed-gas regulating valve 17 and a feed-gas source (for instance, a gas which is blown in under positive pressure by an air compressor or gas compressor). 7 is an arrow indicating the direction of flow of a compressed gas fed from the feed-gas source. 11 is a detecting pipe for detecting pressure on the lower pressure side of the throttle mechanism 8 and 19 is a pressure detecting pipe on the higher pressure side of the throttle mechanism 8. 12 is a detecting mechanism for detecting a difference in pressure (differential pressure) between the opposite sides of the throttle mechanism 8. 14 is a differential pressure setting device. 15 is a chain line indicating a transmission mechanism for transmitting to a feed-gas regulating valve 13 a signal indicating a deviation of the detected differential pressure from the set pressure. 16 is an air-pressure transmitting pipe for actuating a feed-gas flow regulating valve 17 (it may be an oil-pressure or electric transmitting pipe).

Figure 4:
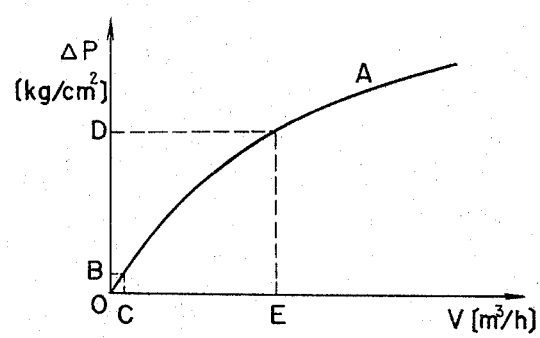
FIG. 4 shows a relationship between differential pressure and flow of feed-gas.

The operation of the above mentioned mechanisms will be explained in the following. As seen from FIG. 4, in which a curve A indicates the relationship between the differential pressure $\Delta P$ (kg./cm.$^2$) between the opposite sides of throttle mechanism 8 and the flow V (m.$^3$/h.) flowing through said throttle mechanism, the differential pressure $\Delta P$ will be zero, when the flow V is zero. On the basis of the above fact it may be assumed that the pressure within the furnace body and the feed-gas pressure will be equal, that is, in a state of equilibrium if the differential pressure between the opposite sides of the throttle mechanism 8 is zero. In such a case a pressure measured at any point in the pipes between the furnace body and the regulating valve 17 will be the same. Utilizing this principle, the present invention has adapted a method, and is characterized thereby, of regulating the feed-gas flow so that the pressure of feed-gas in the pipes 9 and 10 may always be in equilibrium with the fluid pressure to be measured in the furnace body detecting the equilibrium pressure and indicating or recording it as the fluid pressure in the furnace body to be measured. However, so far as an error of measurement is permitted to a certain degree within the feasible range of furnace operation, the differential pressure $\Delta P$ between the opposite sides of the throttle mechanism 8 is to be set to a small value (for instance, the point B in FIG. 4), thereby to cause a small amount of feed-gas to flow in the pipes 9 and 10 (for instance, the point C in FIG. 4) according to said set value in order to prevent the pipe 9 from being clogged with dust contained in the furnace gas. Further, there is the possibility of the fluid pressure in the furnace body being subjected to a violent fluctuation and becoming higher than the feed-gas, resulting in an inflow of fluid containing dust from the furnace body into the connecting pipe to clog the latter with dust, and the differential pressure $\Delta P$ should be set to a larger value as shown by D in FIG. 4 in this case to cause a considerable amount of feed-gas to flow in the direction as shown by the arrow 7 in FIG. 2. When the fluid pressure in the furnace increases rapidly, the equilibrium between the fluid pressure in the furnace and the differential pressure $\Delta P$ will be lost, but the differential pressure $\Delta P$ may be easily placed in equilibrium with the increased fluid pressure in the furnace by the automatic control system according to the present invention.

Feed-gas used for measuring the fluid pressure in this embodiment of the present invention may be any one which does not cause any accident or which reacts positively with the fluid to be measured to facilitate the reaction within the furnace, when it is brought into conact with the fluid, or which does not change the quality of the fluid to be measured. Practically, blast furnace gas, coke oven gas or even air may be used.

Figure 2:
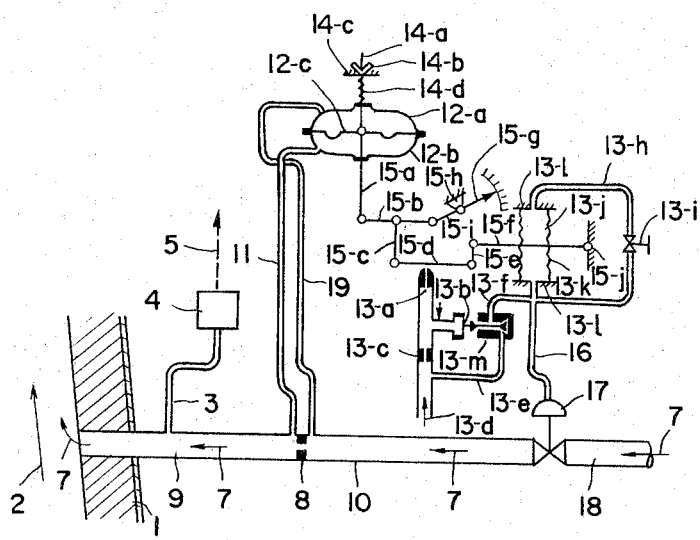
FIG. 2 is a diagram of a detailed arrangement of a pressure measuring control device of the present invention.

The operation of the control mechanism of the present invention will be explained more in detail in reference with FIG. 2. In FIG. 2, 12–a is a pressure detecting chamber for detecting pressure ahead of the throttle mechanism 8, that is, on the gas-feed side connected with the pressure detecting pipe 19 for the higher pressure side, and 12–b is a pressure detecting chamber for detecting pressure behind the throttle mechanism, that is, on the furnace side connected with the pressure detecting pipe 11 for the lower pressure side. 12–c is a partitioning membrane, which moves vertically in accordance with changes in pressures in the chambers 12–a and 12–b. 14–a is a regulating rod for the partitioning membrane balancing and setting spring 14–d. 14–b is a set-regulating butterfly nut, and 14–c is a fixed stand. 15–a is a deviation indicator. 15–h is a holding stand on which a guiding rod 15–i of the deviation indicator 15–g is freely rotatably mounted at the middle thereof. 15–j is a holding stand on which is freely rotatively mounted one end of the restoring lever 15–f. 13–a is a nozzle, 13–b is a diaphragm and 13–c is a throttle resistance which is provided to elevate sufficiently the back side pressure of the nozzle 13–a. 13–d is an arrow indicating the direction of inflow of the regulating feed-air. 13–e is a pipe connecting with a feed-air source. 13–f is a connecting pipe transmitting a control signal issued from a pilot valve 13–m. 13–g is a feed-air pipe leading to an integral throttle valve 13–i and 13–h is a pipe leading to an integral bellows 13–j. 13–k is a proportional bellows. 13–l is a fixed stand for holding one end of the integral belloys 13–j and that of the proportional bellows 13–k, respectively. Other references are the same as in FIG. 1.

The operation of the control mechanism will be explained.

The differential pressure $\Delta P$ (kg./cm.$^2$) is set as reference by regulating the degree of tension of the setting spring 14–d by means of the setting butterfly nut 14–b. The pilot valve 13–m is regulated by the pressure applied to the diaphragm 13–b to control the amount of opening of the feed-gas flow regulating valve 17 so that the partitioning membrane 12–c may come to the central position, wherein the detected differential pressure is equalized with the above set differential pressure. That is, the amount of opening of the feed-gas flow regulating valve 17 is regulated until the partitioning membrane 12–c comes to the central position. And the partitioning membrane 12–c comes to the central position when the relative position of the nozzle 13–a and the flap 15–d is in the normal position. Controlling air coming from the direction shown by 13–d passes through the pilot valve 13–m and is applied to the feed-gas flow regulating valve 17 as well as to the proportional bellows 13–k and the integral throttle valve 13–i. If the restoring lever 15–f and the link 15–e are pushed up by the proportional bellows 13–k, the flap 15–d moves in the direction away from the nozzle 13–a. Consequently, the back side pressure of the nozzle 13–a will be reduced and the diaphragm 13–b will tend to come back to the normal position. Then, because the feed-air pressure will be shut-off by the pilot valve 13–m, the feed-air pressure applied to the feed-gas flow regulating valve 17 will also be reduced, whereby the regulating valve is controlled in proportion to the position of the link 15–e. In other words, when the link 15–e is moved near the bellows side, the control gain will be large and when it moves away from the bellows side, the control gain will be small. On the other hand, because the feed-air applied to the integral throttle 13–i will supply the feed-air pressure gradually to the integral bellows 13–j in accordance with said throttle, the flap 15–d is gradually brought near the nozzle 13–a, whereby the back side pressure of the nozzle 13–a is increased integrally, and the diaphragm 13–b is actuated for regulating the feed-air pressure to be applied to the feed-gas flow regulating valve 17, which is controlled thereby in an integral action. Thus, by controlling the feed-gas flow regulating valve 17 in proportional and integral actions so that a detected differential pressure between the opposite sides of the throttle mechanism will be always equal with the set value, the feed-gas pressures in the pipes 9 and 10 are brought approximately to an equilibrium with the fluid pressure to be measured in the furnace body. In such a state, the pressure detected by the detecting pipe 3 will indicate a pressure which is a little higher than the pressure in the furnace body but within the error of measurement so that a flow of feed-gas of a small amount may be effected in the connecting pipes in the direction toward the furnace, or to a higher pressure than the pressure in the furnace body but within the permitted range of operating furnace where there is a flow of feed-gas of a considerable amount. The thus detected pressure is further converted by means of the pressure signal dispatching converter 4 connected to said detecting pipe 3 to an electric signal 5, which is further transmitted to the indicating and recording meter 6. Thus, the fluid pressure in the furnace body may be continuously indicated and recorded.

Where the differential pressure $\Delta P$ is set to a larger value in order to effect a flow of feed-gas of a considerable amount in the direction toward the furnace body, there may occur some deviation in the detected pressure to be converted to an electric signal by the converter 4 from the actual pressure in the furnace body, that is, an error of measurement. However, in the research made by the inventors such an error of measurement has proved to be about $5/1000$. Therefore, because an accuracy of $1/1000$ is not required, the measurement according to the method of the present invention may be said to be of a high practical value.

The above mentioned error of pressure measurement will be only the pressure loss in the pipes as shown by the following equation:

$$\Delta Pf = \lambda \cdot L/D \cdot \rho u^2 / 2g^c$$

in which $\Delta Pf$: Pressure loss to be found, m. Ag
in which $\Delta Pf$: Pressure loss to be found, m. Aq.
L: Length of the connecting pipe from its end top on the furnace side to the port of the pressure detecting pipe, m.
D: Diameter of the pipe, m.
$u$: Flowing speed of fluid, m./sec.
$\lambda$: Friction coefficient, 0.02 to 0.04 in the case of normal gas (in the case of 100–150 m.$\phi$).
$\rho$: Viscosity coefficient, different according to fluid.
$g^c$: 9.81 m./sec.$^2$ (accelerated velocity of gravity).

The results of measurement in this case are shown in the following table, in which the pressures in the furnace measured according to the present invention are compared with those measured by a conventional direct measuring device. As seen from this table, the errors in values measured by the present invention as compared with those directly obtained by the conventional measuring device are only in the range from 0 to $6/1000$ (under the conditions that the feed-gas flow was 100l./min., the feed-gas pressure amounted to 7 kg./cm.$^2$ and the differential pressure between the pipes 9 and 10 ranged from 0.56 to 0.74 kg./cm.$^2$). The detected pressure obtained by the present invention with such minute errors as about $5/1000$, which coincide with the theoretical ones obtained by the calculation, demonstrate that the measured value obtained by the method of the present invention is practically very effective. As mentioned above, in these examples the control operation was not carried out so as to make the differential pressures a definite value. If the control operation was carried out by making the differential pressure a definite value, a higher accuracy could be obtained.

TABLE

| Number of example | Measured value in pipe 3 (kg./cm.²) | Pressure in furnace body (kg./cm.²) | Differential pressure between pipes 9 and 10 (kg./cm.²) | Pressure of feed-gas in pipe 18 (kg./cm.²) | Error (kg./cm.²) |
|---|---|---|---|---|---|
| | (1) | (2)* | (3) | (4) | (1)−(2) |
| 1 | 0.20 | 0.20 | 0.074 | 1 | 0 |
| 2 | 0.21 | 0.21 | 0.060 | 1 | 0 |
| 3 | 0.28 | 0.28 | 0.056 | 1 | 0 |
| 4 | 0.165 | 0.160 | 0.061 | 1 | −0.005 |
| 5 | 0.128 | 0.126 | 0.066 | 1 | −0.002 |
| 6 | 0.124 | 0.122 | 0.055 | 1 | −0.002 |
| 7 | 0.170 | 0.164 | 0.063 | 1 | −0.006 |
| 8 | 0.183 | 0.178 | 0.061 | 1 | −0.005 |

*Value measured by the known direct measuring method.

Another embodiment of the present invention relates to the measurement of the pressure of fluid in the furnace in case dust particles contained in said fluid are in a molten state.

Figure 3:
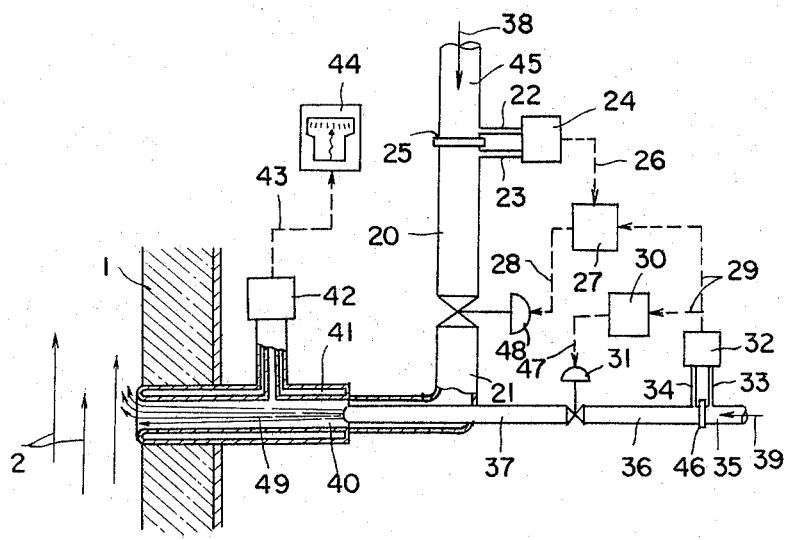
FIG. 3 is a block diagram showing another embodiment of a pressure measuring control device according to the present invention.

This embodiment seeks to effect a flow of gas of high temperature generated in the pressure measuring device connected with the furnace in the direction toward said furnace. As shown in FIG. 3, a pressure measuring tuyere 40 is connected to the furnace body 1 for measuring the static pressure of a reaction gas 2 of high temperature (containing a large amount of molten dust particles) flowing within the furnace body 1. The tuyere is a water-cooled one made of iron (it is not limited to iron but may be aluminium), which is durable at high temperature. It is always cooled by circulating water in the space formed between the inner and outer cylinders. Fuel for combustion is blown into the pipes 35, 36 and 37 in the direction as shown by the arrow 39. Because a throttle mechanism 46 is provided between the pipes 35 and 36, the pressure in the pipes 35 and 36 is detected by the detecting pipes 33 and 34, respectively. The detected value is converted to an electric signal 29 by means of the differential pressure detector 32. The fuel supply regulator 30 is actuated by the electrical signal 29, whereby the fuel supply regulating valve 31 is operated mechanically through the operating mechanism 47 so that the detected differential pressure may be regulated to the set pressure. On the other hand, air for combustion is also blown through the pipes 45, 20 and 21 in the direction as shown by the arrow 38. The differential value between the pipes 45 and 20 caused by the throttle mechanism 25 is also measured by the detecting pipes 22 and 23, respectively. The differential pressure is converted into an electric signal 26 by means of the differential pressure detector 24 and the electric signal is transmitted to the air-fuel ratio regulating meter 27. The air supply regulating valve 48 is controlled through the operating mechanism 28 so that in said regulating meter 27 the air-fuel ratio will be such as to produce a given combustion ratio for the combustion of the fuel the flow of which is detected (for instance, in the case of a normal coke oven gas said ratio is 5 parts of air to 1 part of fuel).

Then, gas having a high temperature generated by the combustion of fuel in the tuyere 40 is jetted into the furnace from the top end of the tuyere to blow away molten dust particles falling down in front of said top end of the tuyere because they are in the molten state, without cooling down the same. Under these conditions the pressure within the furnace is detected by the pressure detecting device 44 and converted to an electric signal 43, which is then continuously measured by the indicating and recording meter 44. Gas 49 having a high temperature supplied to the furnace should be a combustion gas of such a high temperature that molten particles will not be cooled down and having a higher pressure than that within the furnace body. It is preferably blown into the furnace body at a considerably higher temperature than the melting point of the dust particles, if possible, and in some cases a gas which is able to produce a product having a low melting point by a reaction with the dust particles should be selected, because the measurement of pressure may be carried out at a lower temperature than in the normal case. Even in the event that dust particles are coagulated and adhered to the tuyere 40, it is possible to simply blow away the same by elevating the pressure of the gas. In order to avoid heat loss of the high temperature gas 49, the supply is to be installed directly at or near the furnace body, but in view of the direction of flow of gas 2 containing molten dust particles in the furnace body 1, the tuyere may be also installed with a gradient in the direction of flow of gas 2, thereby to effectively prevent the tuyere from being clogged with dust particles.

To sum up, there are three situations under which measuring the fluid pressure takes place according to the present invention, while preventing the connecting pipes between the furnace body and the pressure measuring device from being clogged with dust contained in fluid to be measured: (1) effecting a flow in feed-gas of a small amount in the connecting pipes, (2) effecting a flow of feed-gas in a considerable amount in the connecting pipes and (3) jetting a high temperature gas into the furnace when dust particles contained in fluid to be measured are in a molten state.

The Case (1) is concerned with the situation in which the pressure of fluid in a furnace to be measured is relatively low on the order of 0.1 to 5.0 mm. Aq. and a high accuracy of measurement is required, and the Cases 2 and 3 with the situation in which the pressure of fluid to be measured is relatively high and an error of measurement on the order of $1/200$ may be disregarded, and consequently a relatively large value may be taken as a set value of $\Delta P$.

*Example 1*

In this example, which corresponds to the above Case 1, the differential pressure $\Delta P$ was set to be 2 mm. Aq. The detected value of pressure in the detecting pipe 3 was 0.25 mm. Aq. No error of measurement was found, because the actual pressure in the furnace as directly measured was 0.25 mm. Aq.

*Example 2*

In this example, which corresponds to the Cases 2 and 3, the differential pressure $\Delta P$ was set to be 650 mm. Aq. The detected pressure in the detecting pipe 3 was 1240 mm. Aq, while the actual pressure in the furnace was 1220 mm. Aq. Therefore, the error of measurement was $2/1000$.

Thus, according to the present invention not only can the pressure of fluid containing dust particles be measured, but also the pressure of high temperature fluid containing molten dust particles be continuously measured, and the advantage of the present invention of being able to measure the pressure of the high temperature fluid containing molten dust particles by converting the same to a purified fluid is particularly great.

Though in the above description a high temperature gas containing dust particles in a reaction process device such as a blast furnace or converter has been treated as the object of the measurement, the scope of the present invention is not limited thereto. Other gases the pressure of which is difficult to measure such as corrosive gas may also be the object of the treatment according to the present invention. Further, the object of the measurement is not limited to gaseous fluid, but may comprise a liquid.

What we claim is:

1. A method for continuously measuring a pressure of fluid containing molten dust in a vessel, comprising the steps of blowing fuel for combustion into pipes, said pipes connecting a tuyere installed in a vessel containing fluid to be measured with a fuel supply source, said tuyere being connected with a pressure detecting device, regulating a fuel-flow regulating valve provided in said connecting pipes so that the pressure of feed fuel in the pipes is higher than that of the fluid to be measured in order to effect the flow of fuel in the direction toward the vessel, blowing air for combustion from an air supply pipe to said tuyere, regulating flow of air by an air supply regulating valve provided in the air supply pipe so as to obtain a given combustion ratio, burning fuel in said tuyere to obtain high temperature gas, jetting said high temperature gas into the vessel to blow away molten dust and detecting the pressure of fluid in the vessel by means of said pressure detecting device.

2. A device for continuously measuring a pressure of fluid containing dust in a vessel, comprising a first pipe connected at one end to a vessel containing fluid to be measured, a throttle mechanism at the other end of said first pipe, a second pipe connected at one end to said throttle mechanism and a feed-gas flow regulating valve at the other end of said second pipe, a third pipe connected at one end to said feed-gas flow regulating valve and adapted to be connected at the other end to a feed-gas supply source, a vessel pressure detecting pipe connecting with said first pipe at one end, a converter connected to the other end of said pressure detecting pipe for converting a detected pressure to an electric signal, an indicating and recording meter to which said converter is coupled, a first detecting pipe for detecting feed-gas pressure connected to said first pipe on the lower pressure side of said throttle mechanism, a second detecting pipe for detecting feed-gas pressure connected to said second pipe on the higher pressure side of said throttle mechanism, a differential pressure setting device to which said detecting pipes are connected, a feed gas supply regulator, a transmission mechanism for transmitting the deviation of the detected differential pressure from the set differential pressure connected between said pressure setting device and the feed-gas supply regulator, and a feed-gas flow regulating valve to which said feed gas supply regulator is connected.

3. A device for continuously measuring a pressure of fluid containing molten dust in a vessel, comprising a water cooled tuyere coupled to a vessel containing fluid to be measured, a first feed-fuel pipe connected at one end to said tuyere and a feed-fuel supply regulating valve connected to the other end thereof, a second feed-fuel pipe connected at one end to said valve and a feed-fuel throttle mechanism connected to the other end thereof, a third feed-fuel pipe connected at one end to said feed-fuel throttle mechanism and adapted to be connected to a fuel supply source, feed-fuel pressure detecting pipes connected to said feed-fuel pipes on opposite sides of said feed-fuel throttle mechanism for detecting a differential pressure between said feed-fuel pipes, a first differential pressure detector for converting the detected differential pressure to an electric signal and to which said pressure detecting pipes are connected, a feed-fuel supply regulator to which said first pressure detector is connected, said regulator being connected to said feed-fuel supply regulating valve and being actuated by said signal so that the detected differential pressure may become the set differential pressure to operate said feed-fuel supply regulating valve, a feed-air pipe adapted to be connected to an air supply source and having one end surrounding the end of the fuel-feed pipe in said tuyere, and a feed-air throttle mechanism in said feed-air pipe, feed-air pressure detecting pipes connected to said feed-air pipe on opposite sides of said feed-air throttle mechanism for detecting a differential pressure on opposite sides of said feed-air throttle mechanism, a second differential pressure detector coupled to said feed-air pressure detecting pipes for converting the detected differential feed-air pressure to an electric signal, an air-fuel ratio regulator to which said second differential pressure detector is connected, an air supply regulating valve in said feed-air pipe and connected to said air-fuel ratio regulator is connected to obtain a given combustion ratio, a pressure detecting device coupled to said tuyere for detecting a pressure within the vessel and converting the detected pressure in an electric signal, and an indicating and recording meter to which said pressure detecting device is connected and indicating said electric signal transmitted from said pressure detecting device.

References Cited by the Examiner

UNITED STATES PATENTS

| | | | |
|---|---|---|---|
| 1,100,867 | 6/1914 | Dexter | 73—395 X |
| 2,645,128 | 7/1953 | Walker et al. | 73—395 X |

LOUIS R. PRINCE, *Primary Examiner.*

DONALD O. WOODIEL, *Assistant Examiner.*